United States Patent [19]

Sciammarella

[11] Patent Number: 5,671,042
[45] Date of Patent: Sep. 23, 1997

[54] HOLOMOIRE STRAIN ANALYZER

[75] Inventor: Cesar A. Sciammarella, Chicago, Ill.

[73] Assignee: Illinois Institute of Technology, Chicago, Ill.

[21] Appl. No.: 837,852

[22] Filed: Feb. 18, 1992

[51] Int. Cl.$^6$ ........................................ G01B 9/02
[52] U.S. Cl. ..................... 356/35.5; 356/347; 356/359
[58] Field of Search .................... 356/35.5, 345, 356/347, 348, 359; 359/1, 9; 113/800

[56] References Cited

U.S. PATENT DOCUMENTS

| | | |
|---|---|---|
| 3,503,690 | 3/1970 | Sciammarella . |
| 3,860,346 | 1/1975 | Kersch et al. ............... 356/348 |
| 3,985,444 | 10/1976 | Takashima et al. . |
| 4,436,419 | 3/1984 | Stetson et al. . |
| 4,591,996 | 5/1986 | Vachon . |
| 4,722,600 | 2/1988 | Chiang . |
| 4,794,550 | 12/1988 | Greivenkamp, Jr. ............ 356/357 |
| 4,850,693 | 7/1989 | Deason et al. .............. 356/35.5 |
| 5,020,904 | 6/1991 | McMahan, Jr. . |

FOREIGN PATENT DOCUMENTS

| | | |
|---|---|---|
| 298830 | 5/1972 | Austria . |
| 1392448 | 4/1975 | United Kingdom . |
| 1460861 | 1/1977 | United Kingdom . |
| 1593284 | 7/1981 | United Kingdom . |

OTHER PUBLICATIONS

Sciammarella, C.A. et al., "Measurement of Strains at High Temperatures by Means of Electro–optics Holography", Illinois Institute of Technology, Department of Mechanical and Aerospace Engineering, Chicago, Illinois 60616, Jun. 1991.

Sciammarella, C.A. et al., "Electro–optical System for the Non–destructive Evaluation of Bioengineering Materials", SPIE Proceedings of the International Conference on Biomedical Optics, Jan. 20–25, 1991, Los Angeles, Laboratory of Experimental Mechanics of Materials, Department of Mechanical and Aerospace Engineering, Illinois Institute of Technology, Chicago, Illinois, 60616, Jan. 20, 1991.

Sciammarella, C.A., et al., "Measurement of Strains by Means of Electro–optics Holography", Proceedings of SPIE's Optical Engineering Midwest, Sep. 27, 28, 1990, Illinois Institute of Technology, Department of Mechanical and Aerospace Engineering, Chicago, Illinois 60616.

Sciammarella, C.A., et al., "An Optical Technique to Measure Micro Displacements", Proceedings of the Conference on Applied Stress Analysis, Aug. 30–31, 1990, University of Nottingham, U.K., Illinois Institute of Technology, Department of Mechanical and Aerospace Engineering, Chicago, Illinois 60616.

Sciammarella, C.A., et al., "An Electro–optical System to Measure Strains", 5th International Conference on Experimental Mechanics, Proceedings of the Conference, Aug. 20–24, 1990, Copenhagen, Denmark, Department of Mechanical and Aerospace Engineering, Illinois Institute of Technology, Chicago, Illinois 60616.

Sciammarella, C.A., et al., "Measurement of Residual Stresses by the Moire Method", Proceedings of the SEM Spring meeting of Jun. 1990, Illinois Institute of Technology, Department of Mechanical and Aerospace Engineering, Chicago, Illinois 60616.

(List continued on next page.)

*Primary Examiner*—David C. Nelms
*Assistant Examiner*—Robert Kim
*Attorney, Agent, or Firm*—Speckman, Pauley & Fejer

[57] ABSTRACT

A system and process for the measurement of strains in objects using holographic interferometry comprising a continuous point light source for illuminating the object, a fringe stabilizer for compensating for the vibratory motion of the object, a detector for capturing a holographic image, a rigid body motion compensator for compensating for the rigid body motion of the object caused by displacement of the object upon application of a force, and an electronic system for reconstructing the holographic image to permit comparison of the object before and after application of a force.

16 Claims, 5 Drawing Sheets

OTHER PUBLICATIONS

Sciammarella, C.A., et al., "Electro–optical System to Measure Strains", SECTAM XV, Mar. 22–23, 1990, Atlanta, Georgia, Theoretical and Applied Mechanics, vol. 15.

Sciammarella, C.A., et al., "A High Accuracy Micromechanics Displacement Measurement Optical Technique", American Society of Mechanical Engineers, vol. 102, Micromechanics: Experimental Techniques, 1989.

Sciammarella, C.A., et al., "Measurement of Strains at High Temperature by Means of a Portable Holographic Moire Camera", Hostile Environment and High Temperature Measurements, SEM, Nov. 6–8, 1989, Illinois Institute of Technology, Chicago, Illinois 60616.

Sciammarella, C.A. and Gilbert, J.A., "A Holographic–Moire Technique to Obtain Separate Patterns for Components of Displacement," *Experimental Mechanics*, vol. 16, No. 6, 1976.

Gilbert, J.A., Sciammarella, C.A. and Chawla, S.K., "Extension to Three–Dimensions of Holographic–Moire Technique to Separate Patterns Corresponding to Components of Displacement," *Experimental Mechanics*, vol. 18 (9), 1978.

Sciammarella, C.A. and Chawla, S.K., "A Lens Holographic–Moire Technique to Obtain Components of Displacements and Derivatives," *Experimental Mechanics*, vol. 18, (10), 1978.

Sciammarella, C.A. and Ahmadshahi, M.A., "A Computer Based Holographic Interferometry to Analyze 3–D Surfaces," Proceedings of 11 Triennial World Congress of IMEKO, Houston, Texas, 1988.

Sciammarella, C.A., Sainov, V. and Simova, E., "Holographic Moire Contouring," Proceedings of Holography 1989, International Conference on Holography, Optical Recording and Processing of Information, Varna, Bulgaria, SPIE, vol. 1183, 1989.

Sciammarella, C.A., "Holographic–Moire," Proceedings of the I.U.T.A.M. *Optical Methods in Mechanics of Solids*, Poitiers, France, 1979.

Sciammarella, C.A., Rastogi, P., Jacquot, P. and Narayanan, R., "Holographic–Moire Real Time Observation," *Experimental Mechanics*, vol. 22 (2), 1982.

Sciammarella, C.A., "Holographic–Moire, an Optical Tool for Determination of Displacements, Strains, Contours and Slopes of Surfaces," Optical Engineering, vol. 21 (3), 1982.

Sciammarella, C.A. and Narayanan, R., "The Determination of the Components of the Strain Tensor in Holographic Interferometry," *Experimental Mechanics*, vol. 24 (9), 1984.

HOLOMOIRE STRAIN ANALYZER

BACKGROUND OF THE INVENTION

1. Field of the Invention

This invention relates to a process and apparatus for measuring strains in structures and structural members, such as buildings, bridges, aerospace structures, structural components, nuclear reactor pressure vessels, piping, and engines of all kinds. The process and apparatus of this invention can measure strains in surfaces of any shape and parts of any size. In addition, measurements can be carried out not only at room temperature, but also at very high or very low temperatures.

2. Description of Prior Art

Numerous methods and devices are known for determining strains in structures. The most common of these known methods is a strain gauge which measures strains in structures on a point-by-point basis, and in so doing provides limited information regarding the strains being measured. Strain gauges require careful installation and a cable system and are limited in temperatures of operation and amounts of deformations, or strains, that can be measured. Electronic recording and data processing instrumentation is known for use in conjunction with strain gauges.

A second known method of determining strains in structures is the use of photoelastic coatings. However, photoelastic coatings also require careful installation and can only measure the difference of the strains. To obtain numerical values, point-by-point measurements are required. In addition, there are no known computerized systems available for recording and processing data acquired from photoelastic coatings.

A third known system for determining strains in structures is the SPATE Stress System which is a fully computerized field instrument. However, it contains two important limitations; it provides only the sum of the stresses measured, and the structure to be analyzed must be vibrated in order to determine the strains in the structure.

Also used to measure strain in structural members are moire systems in which a reference grid is applied to the surface of the structural member to be analyzed after which a force is applied to the structural member and light reflected from the resulting grid is compared to light reflected from the reference grid to determine strain in the structural member resulting from application of the force. U.S. Pat. No. 4,722,600 teaches an apparatus and method for measuring strain using a reference grating and a specimen grating superimposed thereon to create an interference pattern, or moire pattern, the phase difference between the two signals generated from the reflected light being used to calculate the strain on the structural member; U.S. Pat. No. 4,850,693 teaches a compact and portable moire interferometer for determining surface deformations of an object; and U.S. Pat. No. 4,794,550 teaches a method of extending the measurement range of moire contouring techniques by constraining the reconstruction of a surface contour based on a priori knowledge about the surface. See also U.S. Pat. No. 3,985,444 which teaches a process for measuring fine deformation of a test object using defraction gratings and U.S. Pat. No. 3,503,690 which teaches an apparatus for optically reading moire fringe patterns.

Another technique for measuring and analyzing strain in structural members is speckle interferometry in which simple high resolution photographs of a surface which is illuminated by coherent light are used resulting in a real time or permanently stored whole field record through interference fringes of a deformed surface. See, for example, U.S. Pat. No. 4,591,996 which teaches a method and apparatus for measuring strain in structural members utilizing a laser beam to illuminate a surface being analyzed and an optical data digitizer to sense the signal provided by the light beam reflected from the illuminated surface, the optical data digitizer being used to compare the signal received from the surface in a reference condition to subsequent signals received from the surface after surface deformation. Similarly, U.S. Pat. No. 5,020,904 teaches a Dynamic Laser Speckle Profilometer and method to perform nondestructive analysis of materials by creating an opto-electronic phase map which is used to generate the deformation and resonance mode mapping of an object under test. U.S. Pat. No. 4,436,419 teaches an optical strain gauge employing interferometry applied to speckle patterns of radiation reflected from two points on an object's surface.

British Patent 1392448 teaches a method of optical inspection using video signals to record speckle patterns resulting from illumination of an object. See also British Patent 1593284 and British Patent 1460861 which also employ video display devices for recording and analyzing speckle patterns.

A fundamental restriction in the use of holographic interferometry in field applications is the need for stability in performing holographic recordings. One known method of overcoming this problem is the use of pulsed holography using pulsed lasers. However, pulsed lasers are expensive and difficult to operate. In addition, real time viewing of patterns is not possible and recording of slow transients, which are very important in many cases, is also not possible.

Thus, operation of a system with continuous recording has many practical advantages. However, most of these advantages are lost in field applications due to the need for mechanical isolation. Holographic interference fringes observed in real time can exhibit short term jitters and long term drifts, even if the observations are made under conditions of mechanical isolation, due to vibration of the optical components, laser wavelength changes, air currents, and thermal expansion of optical components.

SUMMARY OF THE INVENTION

It is an object of this invention to provide a method and apparatus for measurement of strains in structures including buildings, bridges, aerospace structures, structural components, nuclear reactor pressure vessels, piping, and engines of all kinds.

It is an object of this invention to provide a system which can measure strains in surfaces of arbitrary shape and size, the size of the part to be analyzed being limited only by the power of the illumination source.

It is yet another object of this invention to provide an optical system capable of measuring strains in curved surfaces, displacements and contours without changing optical arrangements.

It is another object of this invention to provide a system for measurement of strains in objects not only at room temperature, but also at very high temperatures and very low temperatures.

It is yet another object of this invention to provide a system for measuring strains in structural members which is portable.

It is another object of this invention to provide a system for measuring strains in structural members using holographic interferometry.

It is yet another object of this invention to provide a system for measuring strains in structural members which eliminates the need for vibration isolation.

It is yet another object of this invention to provide a system for measurement of strains in objects using holographic interferometry which permits real time observation of holographic interference fringes.

It is still another object of this invention to provide an optical system for measuring the stress of a structural member which eliminates the requirement for an internal reference beam which is characteristically common to known systems employing holography.

These and other objects are achieved by a system for measurement of strains in objects including structural members in accordance with one embodiment of this invention comprising a point source illumination means for illuminating the object, fringe stabilization means for compensating for vibratory motion of the object, fiber optics instabilities and random fluctuations caused by air, detector means for capturing a holographic image, compensation means for compensating for the displacement of the object upon application of a force, and processing means for electronically reconstructing the holographic image captured by the detector means.

More specifically, the system comprises a continuous laser, the output of which is connected to a coupler which is used to launch the light generated by the laser onto at least three, and preferably four, optical fibers, each of which optical fibers produces a point source of illumination. In a preferred embodiment of this invention, the optical fibers are disposed so as to produce symmetric double illumination in two orthogonal directions of the object to be analyzed, that is, two optical fibers for vertical illumination and two optical fibers for horizontal illumination. In this manner, readings in both orthogonal directions, although taken separately, can readily be taken sequentially.

The light from one of the optical fibers in each orthogonal direction comprises a reference beam which is passed through a first lens and subsequently reflected from the object to be analyzed. The second optical fiber in each orthogonal direction is connected to a fringe stabilization unit for compensating for vibratory motion of the object, fiber optics instabilities and random fluctuations caused by air, a critical feature of this invention, after which the light from the second optical fiber is passed through a second lens and reflected from the surface of the object to be analyzed. Such light is out of phase with the light generated by the reference beam and reflected from the object. A portion of the light reflected from the object is captured by a detector which generates a signal which is relayed to the fringe stabilization unit, which signal is used to adjust the light from the optical fiber passing through the fringe stabilization unit to maintain a fixed relationship between the light from such optical fiber and the reference beam. In this manner, differences between the light passing through the fringe stabilization unit and the reference beam caused by vibration of the object, fiber optics instabilities, and random fluctuations caused by air are eliminated.

Light is also reflected from the object to be analyzed and captured by a camera, the position of which can be adjusted to correct for displacements of the object being analyzed resulting from application of a force to the object. The camera generates an electronic signal which is transmitted to a signal extraction and processing module for analysis and recording. This signal extraction and processing module electronically reconstructs the holographic image generated by the system to enable comparison of the object being analyzed before and after application of the force thereto.

BRIEF DESCRIPTION OF THE DRAWINGS

These and other features of the invention will be better understood when considered in conjunction with the detailed description and following figures in which.

DETAILED DESCRIPTION OF PREFERRED EMBODIMENTS

The present invention is based on holographic interferometry and uses the techniques of the holographic moire method. See the following references: Sciammarella C.A. and Gilbert, J.A., "A Holographic-Moire Technique to Obtain Separate Patterns for Components of Displacement," Experimental Mechanics, Vol. 16, No. 6, 1976; Gilbert, J.A., Sciammarella, C.A. and Chawla, S.K., "Extension to Three-Dimensions of Holographic-Moire Technique to Separate Patterns Corresponding to Components of Displacement," Experimental Mechanics, Vol. 18 (9), 1978; Sciammarella, C.A. and Chawla, S.K., "A Lens Holographic-Moire Technique to Obtain Components of Displacements and Derivatives," Experimental Mechanics, Vol. 18, (10), 1978; Sciammarella, C.A., "Holographic-Moire," Proceedings of the I.U.T.A.M. Optical Methods in Mechanics of Solids, Poitiers, France, 1979; Sciammarella, C.A., Rastogi, P., Jacquot, P. and Narayanan, R., "Holographic-Moire Real Time Observation," Experimental Mechanics, Vol. 22 (2), 1982; Sciammarella, C.A., "Holographic-Moire, an Optical Tool for the Determination of Displacements, Strains, Contours and Slopes of Surfaces," Optical Engineering, Vol. 21 (3), 1982; Sciammarella, C.A. and Narayanan, R., "The Determination of the Components of the Strain Tensor in Holographic Interferometry," Experimental Mechanics, Vol. 24 (9), 1984; Sciammarella, C.A. and Ahmadshahi, M.A., "A Computer Based Holographic Interferometry to Analyze 3-D Surfaces," Proceedings of 11 Triennial World Congress of IMEKO, Houston, Tex., 1988; and Sciammarella, C.A., Sainov, V. and Simova, E., "Holographic Moire Contouring," Proceedings of Holography 1989, International Conference on Holography, Optical Recording and Processing of Information, Varna, Bulgaria, SPIE, Vol. 1183, 1989.

In accordance with this method, all the necessary information to compute strains in an arbitrarily shaped and oriented surface is determined by recording two images with symmetric double illumination in two orthogonal directions, plus a third image to obtain a contour of the surface. To obtain displacements normal to the surface of the object, a fourth image must be captured.

Figure 1:
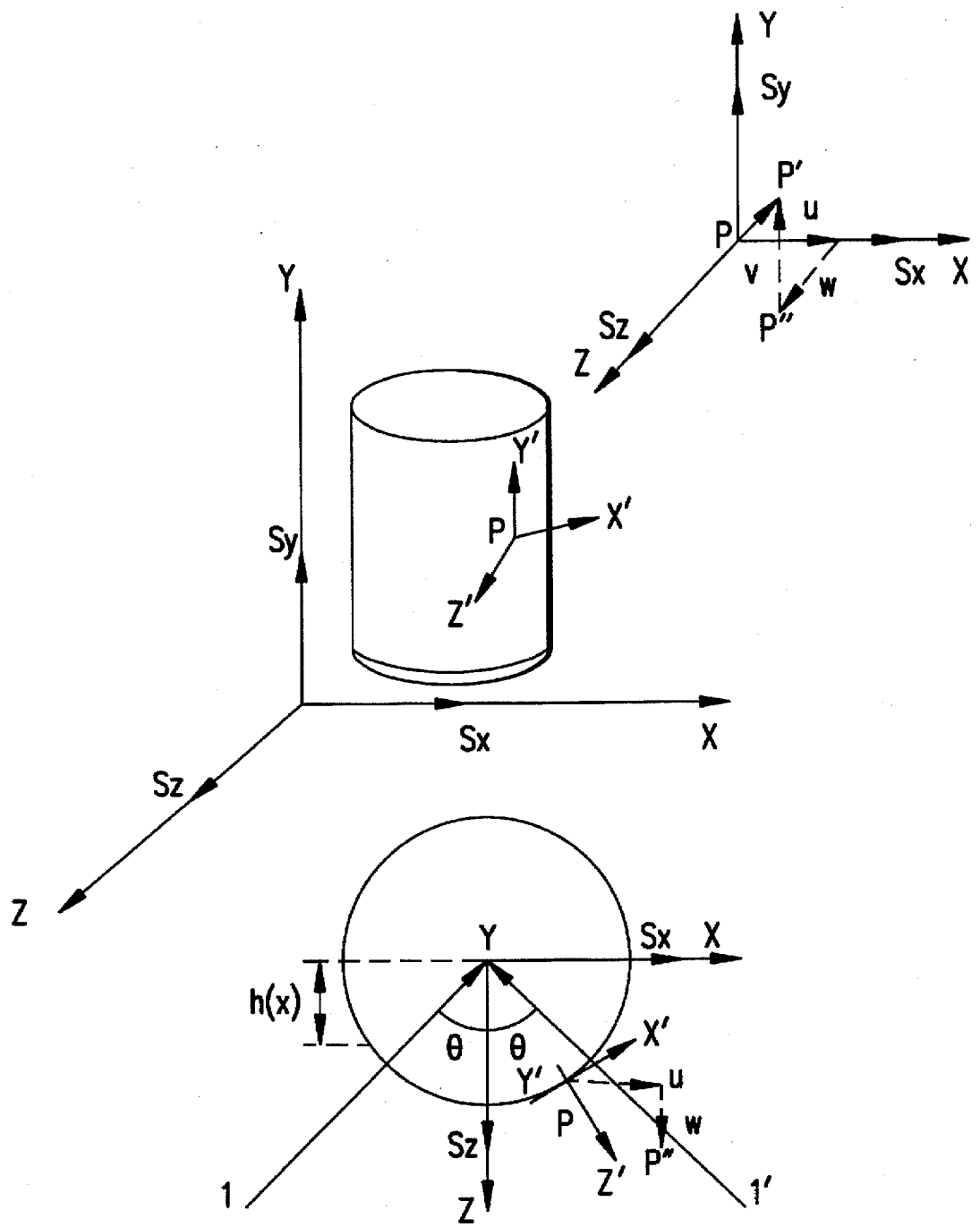
FIG. 1 shows a graphic representation of a holographic moire projection of the displacements onto a fixed coordinate system and subsequent contouring of a surface.

In a spatial coordinate system (x, y, z), as shown in FIG. 1, the displacement u, v, w can be measured where:

$$u = \vec{S_x} \cdot d \quad (1)$$

$$v = \vec{S_y} \cdot d \quad (2)$$

$$w = \vec{S_z} \cdot d \quad (3)$$

with sensitivity vectors, $$|\vec{S_x}| = \lambda \div 2\sin\theta \quad (4)$$

$$|\vec{S_y}| = \lambda \div 2\sin\theta \quad (5)$$

$$|\vec{S_z}| = \lambda \div 2(1 + \cos\theta) \quad (6)$$

where $\lambda$ is the wavelength of the illuminating beam and $\theta$ is the angle of the illumination beam with a normal to the projecting plane, in this case the (x,y) plane. Using the displacement measurements, the strains are obtained from the following equation:

$$\epsilon_{ij} = (\tfrac{1}{2})(u_{i,j} + v_{j,i}) \quad (7)$$

where the indicial notation and summation conventions have been used. The above equations give the strains with respect to a fixed coordinate system. To obtain local values, it is necessary to transform the measured tensor components to the local system. Because one only determines the derivatives with respect to coordinates x and y, the derivatives with respect to the third coordinate z can be computed by using the chain rule of differentiation. Introducing the notation ($x_1 = x$, $x_2 = y$, $x_3 = z$), $$\frac{\delta u_\alpha}{\delta x_3} = \frac{\delta u_\alpha}{\delta x_\alpha} \frac{\delta x_\alpha}{\delta x_3} \quad (8)$$

where $\alpha$ equals 1, 2. To obtain the derivatives of the coordinates with respect to $x_3$, it is necessary to have the contours of the surface. Once the components of the strain tensors are known in the fixed coordinate system, the local values are determined by the tensor transformation, $$\epsilon'_{ij} = a_{ir}{}^p a_{jn} \epsilon_{nm} \quad (9)$$

The $a_{ij}$ can be determined from the contour of the surface.

To obtain the necessary derivatives and direction cosine required by the tensor transformation, the contour of the surface must be obtained. This is done using the same set up used for measurement of strains, double beam illumination and a rotation of the illumination beams. Applying these techniques, fringes are obtained that provide the contour of the surface with respect to the coordinate plane, plane (x, y) in FIG. 1. The height of the surface is given by the equation:

$$h(x) = \frac{\gamma\lambda}{4\pi\alpha\Delta\alpha} \quad (10)$$

where $\gamma$ is the argument of the contour fringes produced by the double illumination beam, $\alpha$ is the inclination of the illumination beam with respect to the normal to the reference plane, and $\Delta\alpha$ is the rotation of the illumination beam.

Figure 2:
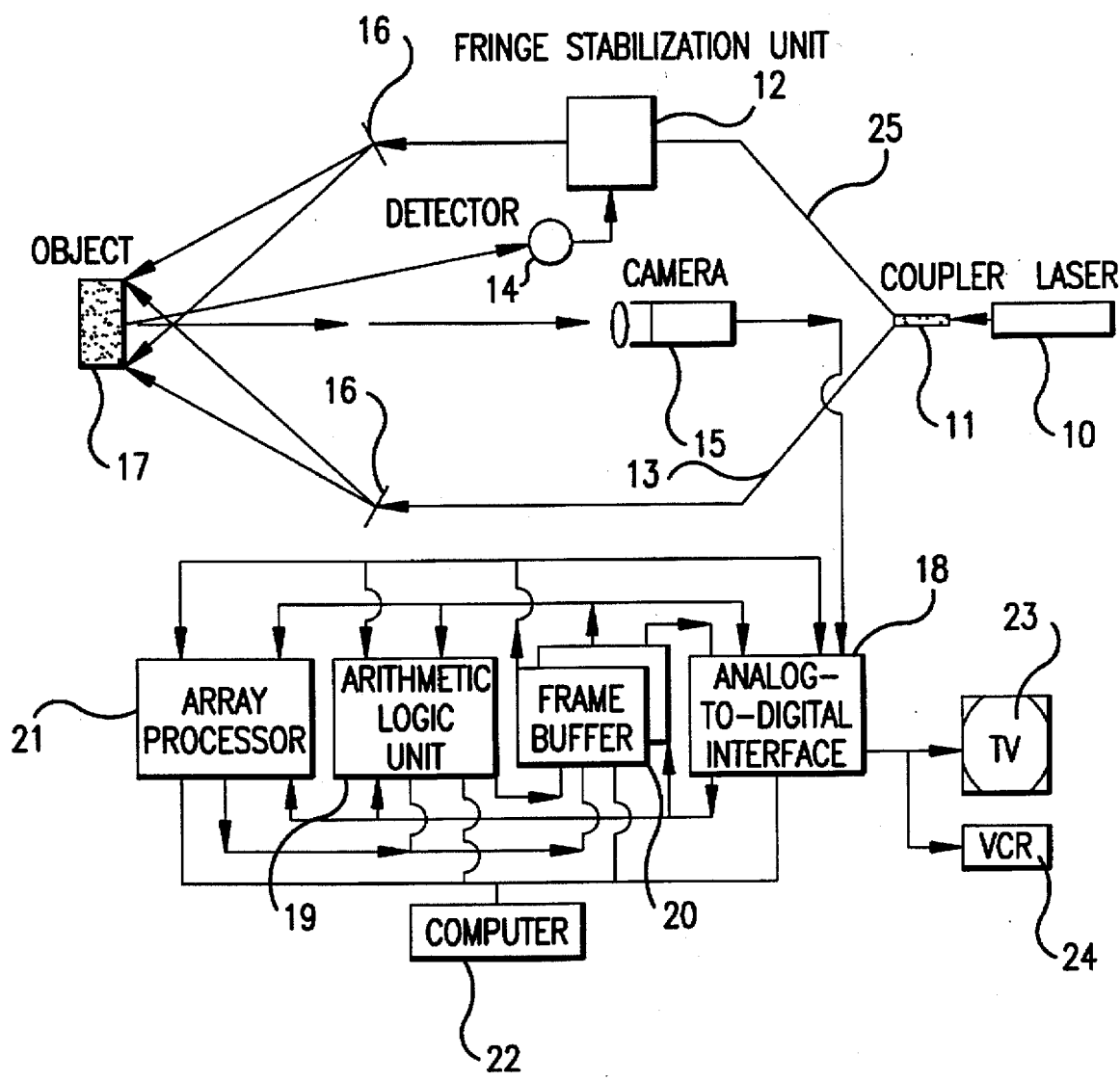
FIG. 2 is a schematic diagram of the system in accordance with one embodiment of this invention.

FIG. 2 shows a schematic representation of a holostrain analyzer in accordance with one embodiment of this invention. From a function point of view, the system comprises the following components: an illumination and light conditioning system; signal detection means; signal extraction means; data processing means; data output means; and a host processor.

Figure 4:
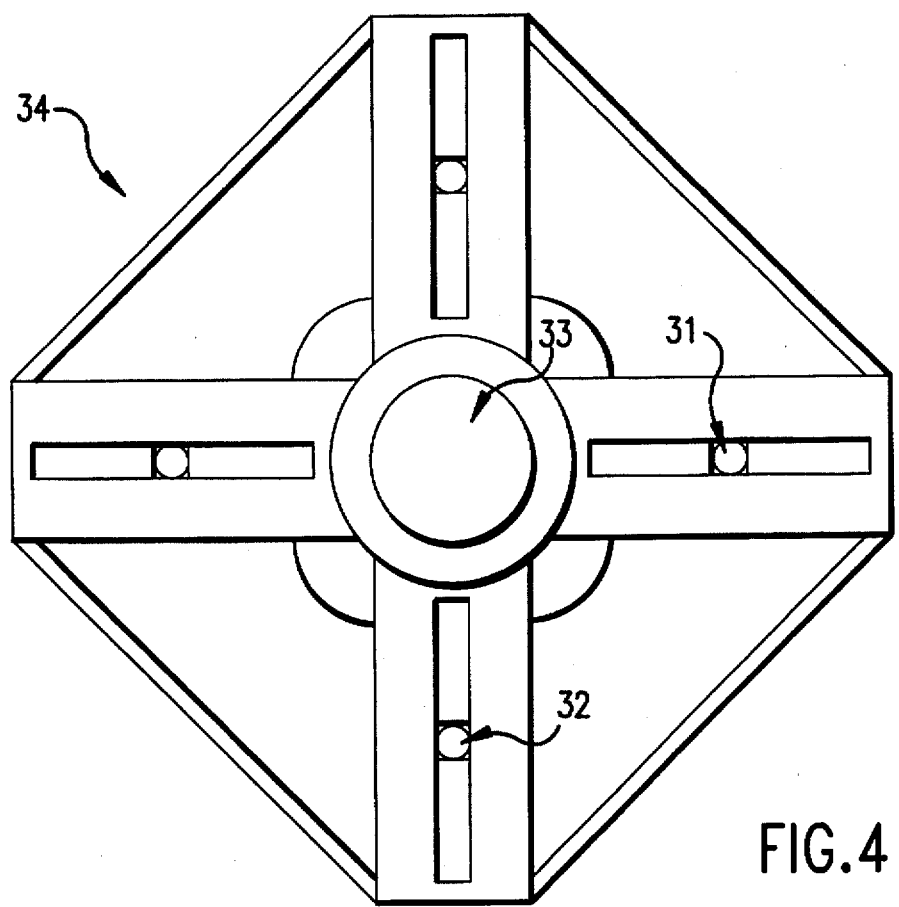
FIG. 4 is a diagram of the illumination head of a holo-moire strain analyzer with four point illumination sources in accordance with one embodiment of this invention.

The illumination system in accordance with one embodiment of this invention comprises illumination head 34 having, preferably, four point light sources 30, 31 in an orthogonal array as shown in FIG. 4 for illumination of the surface of the object to be analyzed disposed about camera lens 33. As few as three point sources may be used in accordance with this invention. Light is transmitted from laser 10 through single mode directional coupler 11 to a preferably single mode optical fiber which, in turn, is split into two arms 13, 25 for each direction, vertical or horizontal, of illumination. The light passes through an optical switch which provides light to the point sources for vertical illumination 30 or horizontal illumination 31. One of the fiber optic arms 25 from coupler 11 passes through fringe stabilization unit 12 which is used to maintain a constant relationship between the light emitted from this arm 25 and the light emitted from the other arm 13, which light constitutes the referenced beam.

In the fringe stabilization unit, optical fiber arm 25 is wound around piezoelectrical ceramic cylinder (PZT), or piezoelectrical phase shifter (PPS), 53 a number of times, the number being designed to produce a given phase relationship as a function of voltage applied to the PZT. Detector 14 detects the same displacement field that camera 15 records of the surface of the object 17 under observation. Lenses 16 focus a point on the surface under analysis onto detector 14. Detector 14, based on light reflected from object 17, produces an error signal which is transmitted to PZT 53. As a result, vibration body motion displacements, fiber optics instabilities and random fluctuations are compensated for by fringe stabilization unit 12, thereby allowing operation of the system without the mechanical isolation devices required by known holographic systems.

The optical signal from object 17 is received by camera 15 and transmitted to a signal extraction and processing module comprising analog-to-digital (A/D) and digital-to-analog (D/A) module 18, which converts the signal produced by the camera into digital form or the output of the system from digital to analog form, arithmetic logic unit 19 which performs arithmetic and logical operations on the system, storage memories or frame buffers 20 for storage of information during data extraction and processing, array processor 21 for performing certain operations needed during data extraction and processing with high efficiency, computer 22 for controlling the different components and performing some of the operations required during data processing, and television monitor 23 or printer 24 for graphically depicting the output of the system.

More specifically, the signal processing system provides the following functions: image digitization performed by A/D and D/A module 18, image storage performed by frame buffers 20, real time operation using the image data performed by arithmetic logic unit 19, and high speed data computation performed by array processor 21. Thus, a holographic image of object 17 being analyzed is captured by camera 15 and transmitted to the signal processing system for processing as discussed above. A force is applied to object 17 and a second holographic image of object 17 is captured by camera 15 and transmitted to the signal processing system for processing and comparison to the first holographic image electronically stored therein.

An important element of this invention is the use of point source illumination as opposed to collimated illumination used in previous state of the art applications. The software used for processing the information in the signal extraction and processing module provides the necessary corrections required by replacing collimated illumination with point sources. Tests performed using point source illumination show that in-plane strains can be measured with the same degree of accuracy that is obtained using collimated illumination. As a result, this invention makes it feasible to measure strains in large surfaces without using large collimating lenses which would otherwise render this technique cumbersome and expensive.

Figure 3:
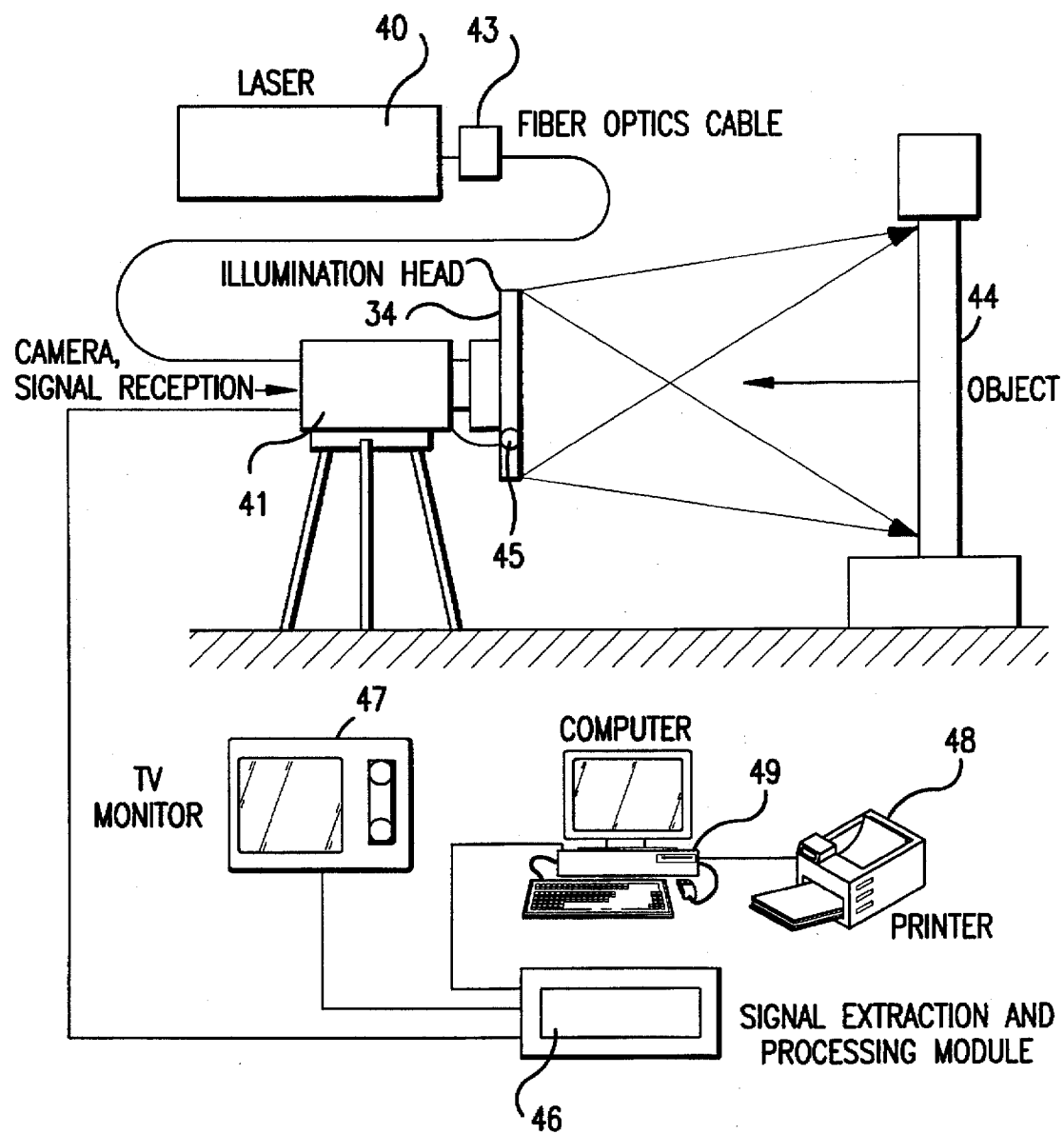
FIG. 3 is a diagram of the main components of a holo-moire strain analyzer in accordance with one embodiment of this invention.

In the embodiment of this invention shown in FIG. 3, laser 40 is connected to camera 41 through fiber optics cable 42. Laser cable connector 43 is sealed so that no adjustments are required to launch the light onto fiber optics cable 42. Two separate lasers are used for the vertical and horizontal illumination as shown in FIG. 4 such that measurements in two orthogonal directions can be made sequentially without interruption. Point sources 30 and 31 are adjustable, the distances therebetween depending on the size of the surface to be observed. As before, one of point sources 30 and one of point sources 31 produces a reference beam while the other of point sources 30, 31 produces a beam which is adjusted to compensate for vibrational motion of object 44, fiber optics instabilities and random fluctuations caused by air. The geometry of the design in accordance with this embodiment of the invention is such that the area to be observed can be varied from square meters to areas on the order of square centimeters. The in-plane components are determined by applying equations (1) and (2) above with the sensitivities given by equations (4) and (5) above. The out-of-plane displacement is obtained by applying equation (3) above with a sensitivity given by equation (6) above. Accordingly, holograms can be recorded without using a reference beam as required by the known art, thereby greatly simplifying the design of the system and its field application without resorting to optical path compensation.

After launching of the light onto fiber optics cable 42, the light beams are beamed onto object 44 and reflected therefrom as indicated by the arrows. Certain of the reflected light is detected by detector 45 in the form of a photodiode which is connected to fringe stabilization unit 12 positioned in camera 41. One image of object 44 without application of a force thereto is captured by camera 41 and the output signal therefrom transmitted to signal extraction and processing module 46 in which the signal is processed for display on television monitor 47 or printer 48. Computer 49 is used to control the entire system. Object 44 is then subjected to a force and a second image is recorded by camera 41, processed in signal extraction and processing module 46 and compared to the first image to produce fringes which show changes in the reflection of light resulting from application of the force to object 44.

One of the restrictions of holographic interferometry when applied to the measurement of strains is the limited range of displacement of the object that can occur upon application of the force before fringe visibility is lost. Due to the random nature of interfering wavefronts, only identical regions can interfere. Identical regions contain identical speckles in the reconstructed image. In image holography, the type of holography used in holographic television, the information corresponding to a point is recorded locally in an area that corresponds to the size of the speckle. Fringes can be observed if the two speckles corresponding to the same region overlap in the image plane. As the relative displacement between the two speckles increases, fringe contrast is reduced.

To overcome problems associated with displacement of object 44 upon application of a force, camera 41 is supported in a system which permits movement of the optical axis of camera 41 vertically, horizontally, and rotationally. To compensate for the motion of the area of the surface of object 44 under observation, two reference areas are introduced on the surface of object 44. The motion of the centroids of each of these areas is obtained from images captured by camera 41. Fast Fourier Transforms (FFT) of the initial and displaced positions of the referenced areas are computed. The cross correlation of the FFT's in the Fourier plane provide the displacement vector of the centroids of the referenced areas. The displacements can be obtained with an accuracy better than ¼ of a pixel, the minimum resolution area of the image system. Knowing the displacements of two points of the surface, it is possible to compute the translation components and amount of rotation to restore the points to their original positions.

Figure 6:
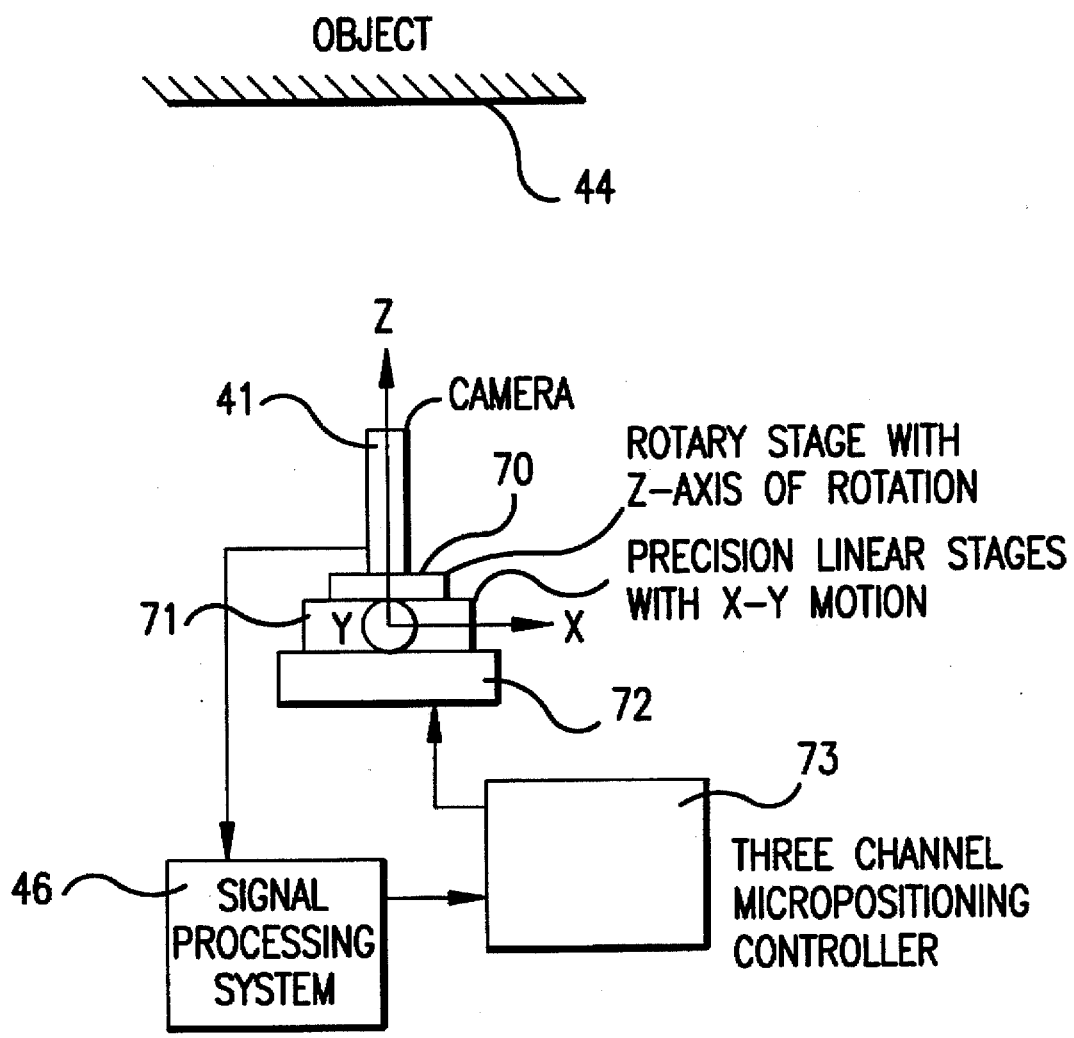
FIG. 6 is a schematic diagram of a position tracking system for correction of object displacement as a result of application of a force in accordance with one embodiment of this invention.

Actual operation of the correction is done automatically and camera 41 is automatically displaced as object 44 is loaded. FIG. 6 shows a schematic representation of the compensation system. The system computes the displacements in signal processing module 46 and produces three signals that are transmitted to controller 73 of the motion stages 70, 71, 72 that support the camera. Motion stage 70 is a rotary stage having a Z-axis of rotation and motion stages 71, 72 are precision linear stages with x-y motion. A loop repeats the operation until the loading stops and the position of the point is no longer changed. The images are kept in correlation and measurements can be made for the typical strain amounts encountered in practice.

Figure 5:
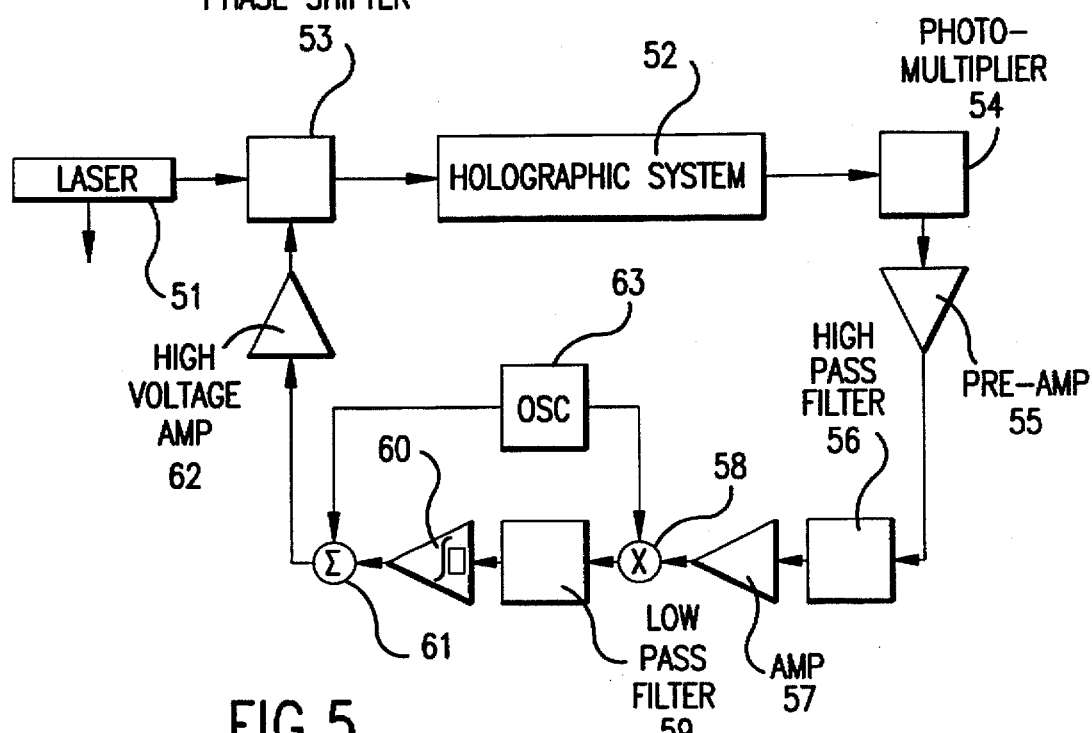
FIG. 5 is a schematic diagram of the illumination and fringe stabilization unit in accordance with one embodiment of this invention.

FIG. 5 shows a schematic representation of the system in accordance with one embodiment of this invention for compensating for vibrational motions of the object being analyzed, fiber optics instabilities and random fluctuations caused by air motion. The system comprises for each direction of illumination, that is, vertical and horizontal illumination, laser 51, holographic image capturing system 52, piezoelectric ceramic cylinder (PZT), or piezoelectric phase shifter (PPS), 53 and an electronic circuit that provides PPS 53 with a voltage that compensates for phase changes in the light beams due to vibrational motions, fiber optics instabilities, and random fluctuations caused by air motion. One of the optical fibers 30, 31 of the vertical and horizontal illumination system is wrapped around a piezoelectric crystal. The phase changes in light emitted by this optical fiber are produced by dimensional changes of the crystal when a voltage is applied to it. Optical fiber 30, 31 wrapped around said piezoelectric crystal is stretched or contracted, causing changes in the optical path of the light traveling through the fiber.

PPS 53 experiences changes of dimensions according to the voltages applied by the feedback provided by detector 14, 45. Detector 14, 45 senses the light intensity of a small region of object 17, 44 or the light coming from the totality of object 17, 44, depending upon location of detector 14, 45. Detector 14, 45 can be attached in accordance with one embodiment of this invention to the surface of object 17, 44, or in accordance with another embodiment of this invention, can be integral with camera 15, 41. In the latter case, two arrangements are possible: on the image plane of the lens of camera 15, 41, or on the focal plane of the lens of camera 15, 41. Detector 14, 45 receives an intensity that results from double illumination of the surface of object 17, 44 and contains a term that provides the rigid body vibrations of the region sensed in the direction of the sensitivity vector corresponding to the in-plane motion of object 17, 44.

Detector 14, 45 in the form of photomultiplier 54 in accordance with one embodiment of this invention, transmits the signal containing the rigid body vibrations to preamplifier 55 which, after amplification, is transmitted to high path filter 56 which removes the DC component of the signal. The resulting AC component is transmitted to amplifier 57. The amplified AC component is transmitted to multiplier 58 where it is mixed with a reference frequency or dither frequency produced by oscillator 63. After mixing, the resulting signal is transmitted through a low pass filter which removes the dither frequency. The resulting signal is an error signal which contains the displacement information and which together with the dither frequency is transmitted to PPS 53 after going through an integration 60, summator 61 and high voltage amplifier 62. An equilibrium analysis of the circuit shows that the system is in dynamic equilibrium when the phase remains constant in time. If only a small region of the surface of object 17, 44 is being analyzed, the phase of this region will be the reference phase for the phases of all other points of the surface. If a Fourier arrangement is utilized, the phase of the whole surface will be constant in time. The equilibrium phase can be changed by changing the sign of the voltage applied. The system will either be at a maximum or a minimum.

Another important feature of the invention is that for small amplitudes of the dither signal, the error signal contains only two significant harmonics, the first harmonic with the same frequency as the dither and a second harmonic with double the frequency of the dither. For locking purposes, either harmonic can be selected. If the second harmonic is selected, the system locks at the points of null amplitude. As a result, by changing voltages and harmonics, the system can lock at four different phases, each of them separated by $\pi/2$.

While in the foregoing specification this invention has been described in relation to certain preferred embodiments thereof and many details have been set forth for purpose of illustration, it will be apparent to those skilled in the art that the invention is susceptible to additional embodiments and that certain of the details described herein can vary considerably without departing from the basic principles of the invention.

We claim:

1. A system for the measurement of strains in an object comprising:
   a continuous point source illumination means for illuminating at least a portion of a surface of said object, said continuous point source illumination means producing symmetric double illumination in at least two orthogonal directions and comprising at least one continuous laser, at least three optical fibers and a coupler connecting an outlet of said laser to one end of each said optical fiber;
   fringe stabilization means for compensating for vibratory motion of said object, said fringe stabilization means comprising a fringe stabilization detector receiving reflected light from said object and providing a signal to said fringe stabilization circuit, and said fringe stabilization circuit adjusting the phase of said light emitted by one of said optical fibers, maintaining a constant relationship between the phase of said light and the phase of a reference light emitted by another of said optical fibers;
   detector means for capturing a holographic image of said object;
   compensation means for compensating for displacement of said object; and
   processing means for electronically reconstructing said holographic image.

2. A system in accordance with claim 1, wherein said detector means for capturing said holographic image comprises a camera.

3. A system in accordance with claim 2, wherein said compensation means comprises means for adjusting a position of said camera.

4. A system in accordance with claim 1, wherein said fringe stabilization detector is disposed one of on said surface of said object, in an image plane of a lens of a camera for capturing said holographic image, and in a focal plane of said lens of said camera.

5. A system in accordance with claim 1, wherein said fringe stabilization means further comprises a piezoelectric phase shifter around which one of said optical fibers is wrapped and feedback means for controlling said piezoelectric phase shifter.

6. A system in accordance with claim 5, wherein said feedback means comprises a pre-amplifier which receives a signal from said fringe stabilization detector, a high pass filter connected to a pre-amplifier output of said pre-amplifier, an amplifier connected to a high pass filter output of said high pass filter, a multiplier connected to an amplifier output of said amplifier, a low pass filter connected to a multiplier output of said multiplier, an integrator connected to a low pass filter output of said low pass filter, a summator connected to an integrator output of said integrator, a high voltage amplifier connected to a summator output of said summator and to said piezoelectric phase shifter, and an oscillator connected to said multiplier and said summator.

7. A system in accordance with claim 1, wherein said processing means comprises a signal processing means for processing the signal output of a camera, computer means for controlling said system, and output means for displaying an image produced by said system.

8. A system in accordance with claim 7, wherein said signal processing means comprises an analog-to-digital converter, a digital-to-analog converter, at least one frame buffer, at least one arithmetic logic unit, and at least one array processor.

9. A process for measuring strains in an object comprising:
   illuminating at least a portion of a surface of said object with at least two symmetrically disposed continuous light point sources in one of two orthogonal directions, one of said continuous light point sources producing a reference light;
   adjusting the phase of light from said other continuous light point source to maintain a constant relationship with the phase of said reference light;
   capturing a first holographic image of said object with detector means;
   applying a force to said object;
   adjusting said detector means to compensate for displacement of said object;
   capturing a second holographic image of said object;
   electronically reconstructing said first holographic image; and
   comparing said second holographic image to said first holographic image.

10. A process for measuring strains in accordance with claim 9, wherein said surface is illuminated by four said light point sources symmetrically disposed in two orthogonal directions.

11. A process for measuring strains in accordance with claim 9, wherein said phase of light from said other light point source is adjusted by a fringe stabilization means comprising a fringe stabilization detector and a fringe stabilization circuit.

12. A process for measuring strains in accordance with claim 9, wherein each said continuous light point source comprises an optical fiber having one end optically coupled by coupling means to a continuous laser.

13. A process for measuring strains in accordance with claim 16, wherein said optical fiber comprising said other continuous light point source which emits an adjustable light is wound around a piezoelectric phase shifter, said phase changes in said adjustable light being produced by dimensional changes in said piezoelectric phase shifter producing one of stretching and contracting of said optical fiber.

14. A process for measuring strains in accordance with claim 13, wherein a voltage generated by a fringe stabilization circuit is applied to said piezoelectric phase shifter producing said dimensional changes in said piezoelectric phase shifter.

15. A process for measuring strains in accordance with claim 13, wherein said detector means is adjustable vertically, horizontally and rotationally.

16. A process for measuring strains in accordance with claim 9, wherein said first holographic image is electronically reconstructed in a signal processing module which receives said first holographic image from said detector means, said signal processing module comprising an analog-to-digital converter, a digital-to-analog converter, at least one frame buffer, at least one arithmetic logic unit, and at least one array processor.

* * * * *